(12) United States Patent
Hsu

(10) Patent No.: US 7,150,350 B2
(45) Date of Patent: Dec. 19, 2006

(54) PROCESSING APPARATUS WITH CONVEYING UNIT FOR CONTINUOUSLY CONVEYING HEAT PIPES

(76) Inventor: Hul-Chun Hsu, 6F.-3, No. 422, Sec. 2, Liming Rd., Taichung City 408 (TW)

( * ) Notice: Subject to any disclaimer, the term of this patent is extended or adjusted under 35 U.S.C. 154(b) by 3 days.

(21) Appl. No.: 11/043,102

(22) Filed: Jan. 27, 2005

(65) Prior Publication Data

US 2006/0163036 A1   Jul. 27, 2006

(51) Int. Cl.
*B65G 21/10* (2006.01)
(52) U.S. Cl. .............. 198/535; 198/531; 198/836.1
(58) Field of Classification Search ............ 198/530, 198/531, 536, 725, 836.1; 29/726, 726.5; 141/129
See application file for complete search history.

(56) References Cited

U.S. PATENT DOCUMENTS

| | | | | |
|---|---|---|---|---|
| 585,262 | A * | 6/1897 | Edwards | 198/530 |
| 2,307,413 | A * | 1/1943 | Loux | 198/530 |
| 3,000,516 | A * | 9/1961 | Dixon et al. | 198/531 |
| 3,535,847 | A * | 10/1970 | Pernkopf et al. | 198/530 |
| 3,648,823 | A * | 3/1972 | Neer | 198/725 |
| 3,882,993 | A * | 5/1975 | Mead | 198/530 |
| 4,234,288 | A * | 11/1980 | Hartkopf | 198/725 |

* cited by examiner

*Primary Examiner*—James R. Bidwell

(57) ABSTRACT

A processing apparatus for continuously conveying heat pipes includes a feeder, a conveying unit and at least one processing station. The feeder includes a processing stage, which includes a feeding end and an exiting end opposite to the feeding end. A feeding direction is defined from the feeding end and toward the exiting end and the processing station is arranged along the feeding direction. The conveying unit is arranged on the processing stage.

6 Claims, 5 Drawing Sheets

PROCESSING APPARATUS WITH CONVEYING UNIT FOR CONTINUOUSLY CONVEYING HEAT PIPES

BACKGROUND OF THE INVENTION

1. Field of the Invention

The present invention relates to a processing apparatus for continuously conveying heat pipes, and more particularly to a processing apparatus for juxtaposing the heat pipes and moving the heat pipes with a conveying unit, whereby the heat pipes are continuously conveyed and processed.

2. Description of Prior Art

The heat pipes are suitable for heat dissipation of electronic device dues to high thermal conductivity, fast thermal conductivity, light weight, fixed structure, simple structure and versatile usage. Moreover, the heat pipes can dissipate massive heat with no electrical power consumption. The conventional heat pipes are provided with wick structure on inner wall thereof and the wick structure is made of mesh with capillary function. By the capillary function, the working fluid in the heat pipe can be conveyed.

The heat pipes are manufactured by a series of processes including cleaning and annealing of the pipe, filling working fluid, removing non-condensation gas and sealing the pipe. During those processes, the pipes are generally conveyed and clamped by mechanic clips. The pipe wall has the risk of damaging by the clips. The clamping involves the expanding and shrinking of clips such that the process time is prolonged and the yield is degraded.

SUMMARY OF THE INVENTION

The present invention is to provide a processing apparatus for juxtaposing the heat pipes and moving the heat pipes with a conveying unit, whereby the heat pipes can be continuously conveyed and processed with necessary steps such as fluid injection, degas, sealing and solder. Therefore, the pipes can be continuously manufactured and the yield is enhanced.

Accordingly, the present invention provides a processing apparatus for continuously conveying heat pipes includes a feeder, a conveying unit and at least one processing station. The feeder includes a processing stage, which includes a feeding end and an exiting end opposite to the feeding end. A feeding direction is defined from the feeding end and toward the exiting end, and the processing station is arranged along the feeding direction. The conveying unit is arranged on the processing stage.

The above summaries are intended to illustrate exemplary embodiments of the invention, which will be best understood in conjunction with the detailed description to follow, and are not intended to limit the scope of the appended claims.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

Figure 1:
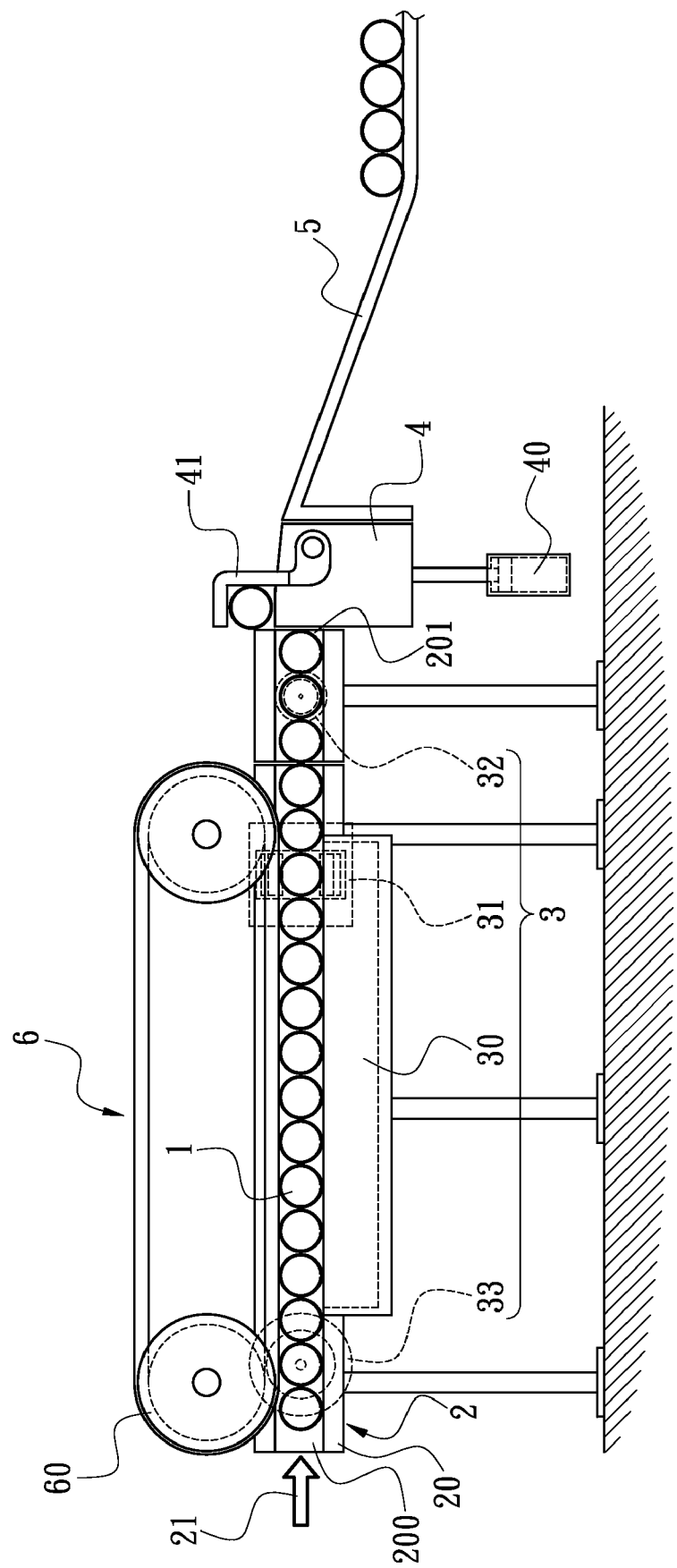
FIG. 1 is a sectional view of the present invention.
Figure 2:
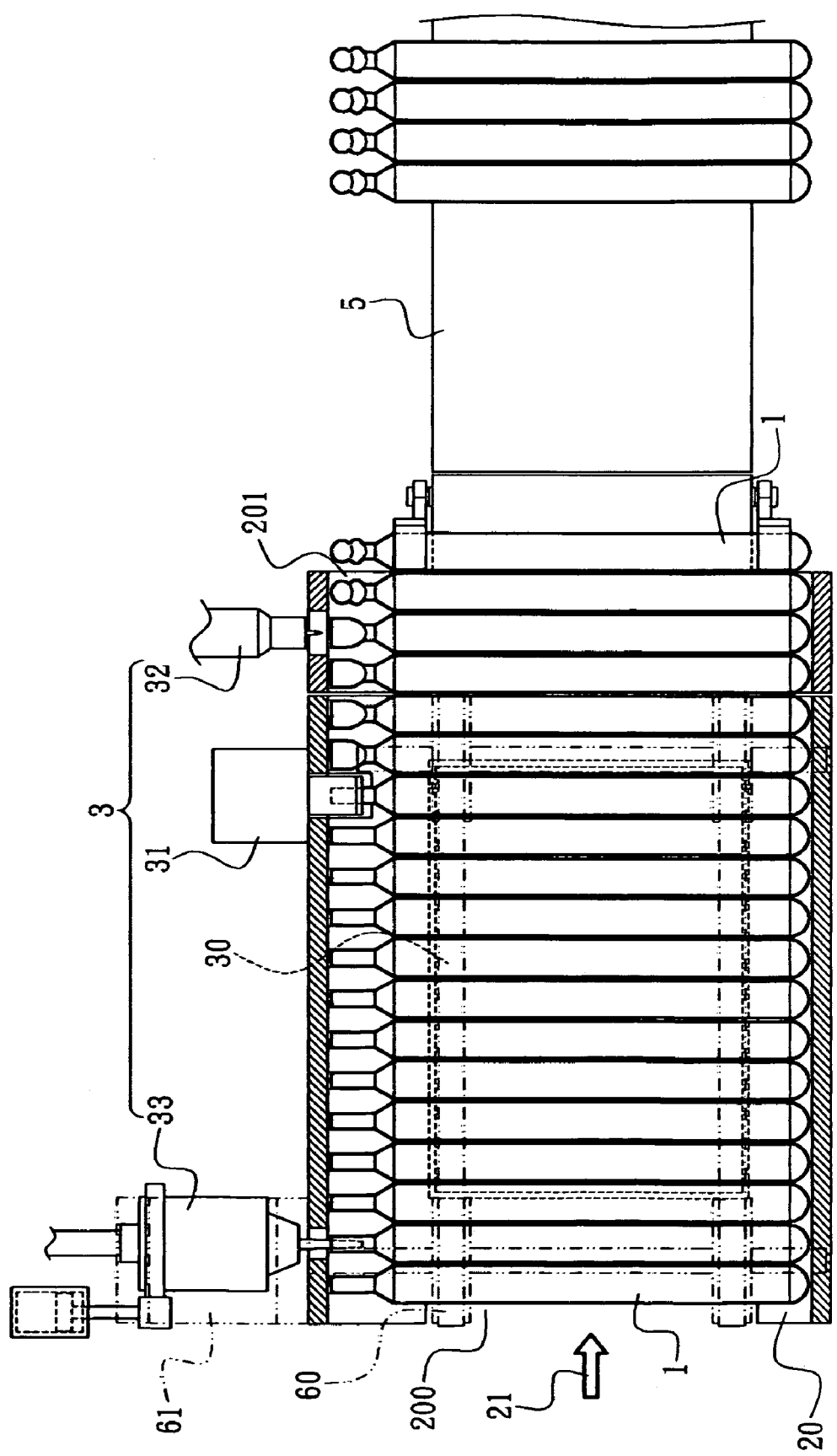
FIG. 2 is a top view of the present invention.
Figure 3:
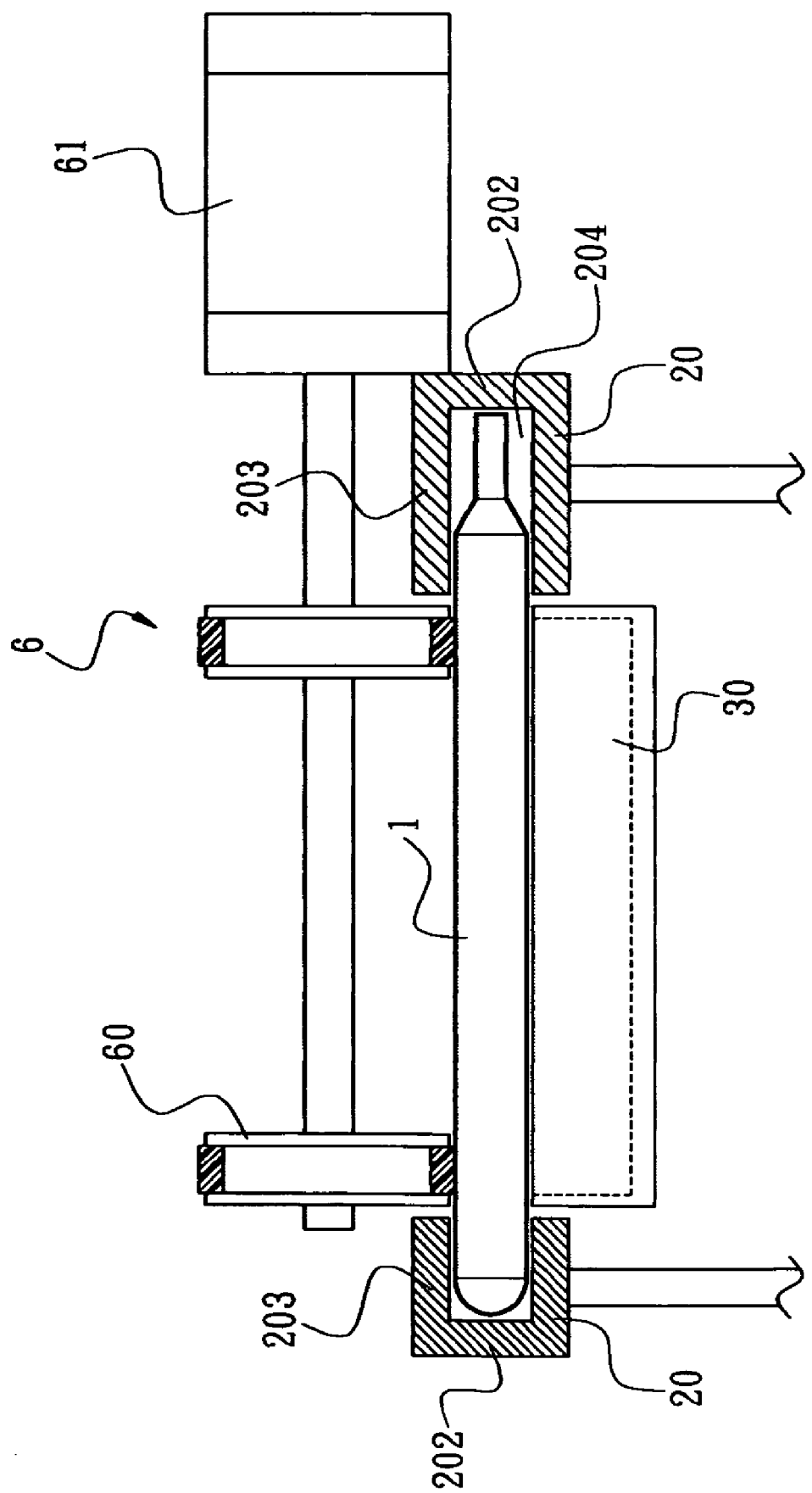
FIG. 3 is a rear view of the present invention.
Figure 4:
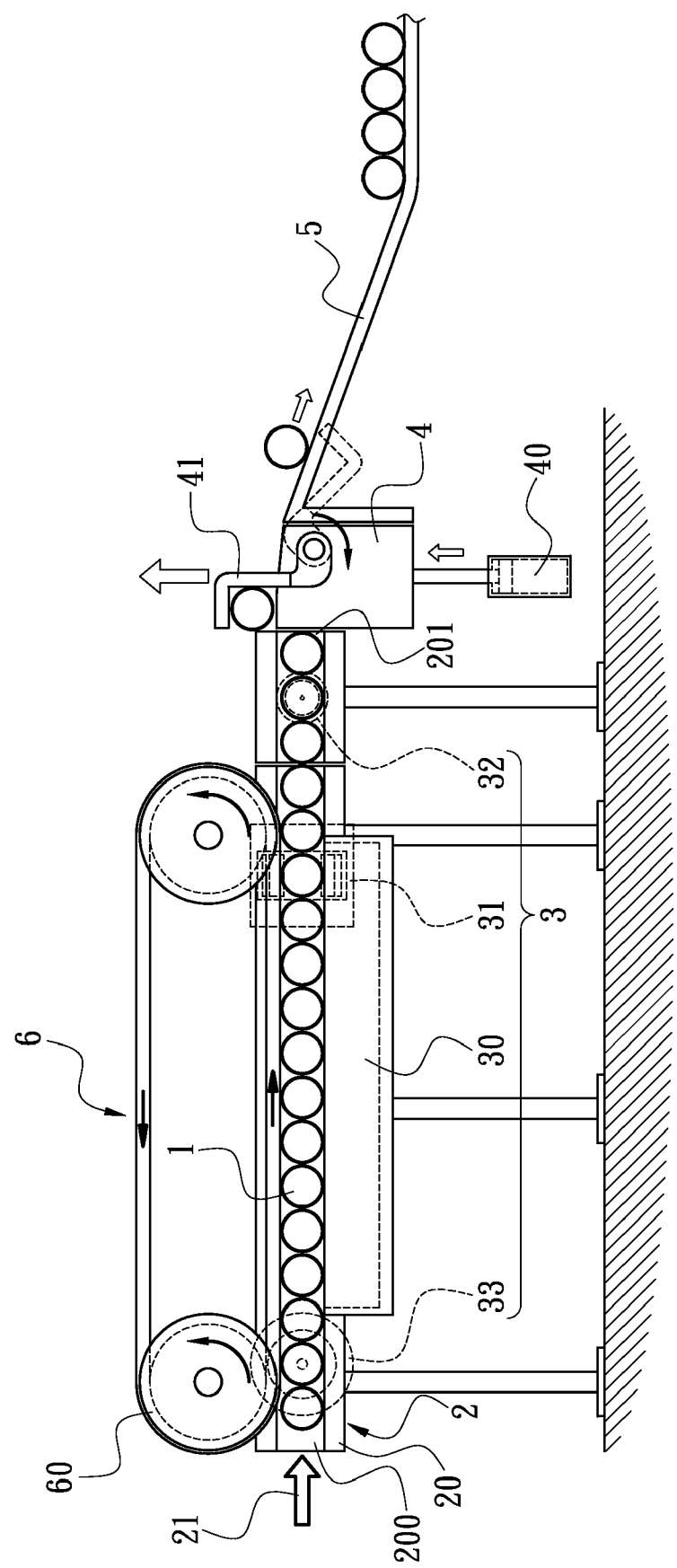
FIG. 4 shows the exit operation of the present invention.

With reference to FIGS. 1 to 3, the present invention provides a processing apparatus for continuously conveying heat pipes and comprising a feeder 2, a conveying unit 6 and at least one processing station 3.

The feeder 2 comprises a processing stage 20 with a feeding end 200 and an exiting end 201 opposite to the feeding end 200. As shown in this figure, a feeding direction 21 extends from the feeding end 200 and toward the exiting end 201 and the pipes 1 are moved along the feeding direction 21. Moreover, the pipes 1 juxtapose on the processing stage 20 in parallel manner and each of the pipes 1 is moved along the feeding direction 21.

In the shown embodiment, the processing stage 20 of the feeder 2 is horizontally arranged and the conveying unit 6 is provided atop the processing stage 20. The conveying unit 6 comprises a belt pulley 60 in contact with top face of the pipe 1, and a motor 61 to drive the belt pulley 60. As shown in FIG. 3, in the preferred embodiment of the present invention, there are two belt pulleys 60 contacting two ends of the pipe 1. Therefore, the pipes 1 are conveyed by the conveying unit 6 and continuously moved from the feeding end 200 toward the exiting end 201.

The processing station 3 is arranged on the processing stage 20 and along the feeding direction 21. The processing station 3 may be provided with a filling unit 33 to fill working fluid into the heat pipe 1, a heating unit 30 for removing gas from the pipe 1, a pressing unit 31 or a soldering unit 32 for sealing the pipe 1, those units are optionally provided for processing need. The processing station 3 is arranged on the processing stage 20 and along the feeding direction 21, wherein the units are optionally arranged. The pipes 1 are arranged in parallel and close to each other. Therefore, the pipes 1 are pushed together and subsequently subjected to various processed such as fluid injection, degas, sealing and solder. Therefore, the pipes are continuously manufactured and the yield is enhanced.

With reference now to FIG. 3, guarding flanges 202 are provided on left and right sides of the processing stage 20 and a press tab 203 is provided atop the guarding flange 202 to define a transmission space 204 for the passage of the pipe 1. The provision of the guarding flanges 202 limits the pipes 1 to move atop the processing stage 20 and the press tab 203 prevent the undulance of the pipes during moving. Therefore, the pipes 1 are stably moved by pushing.

Moreover, the processing apparatus for heat pipes further comprises an exit unit 4 arranged at the exiting end 201 and comprising a dispenser 41 driven by a pneumatic cylinder 40. When the pipes 1 are performing respective processes on the processing stage 20, the dispenser 41 blocks the exiting end 201 to prevent the movement of the pipes. After the pipes 1 finish respective processes on the processing stage 20, the dispenser 41 exits the finished pipes 1 completing the whole process and the pipes 1 to be process are sent from the feeding end 200. Moreover, a supporting plate 5 is provided to support the finished pipes 1 and move the pipes 1 to a deposit place for further test and post-process.

Figure 5:
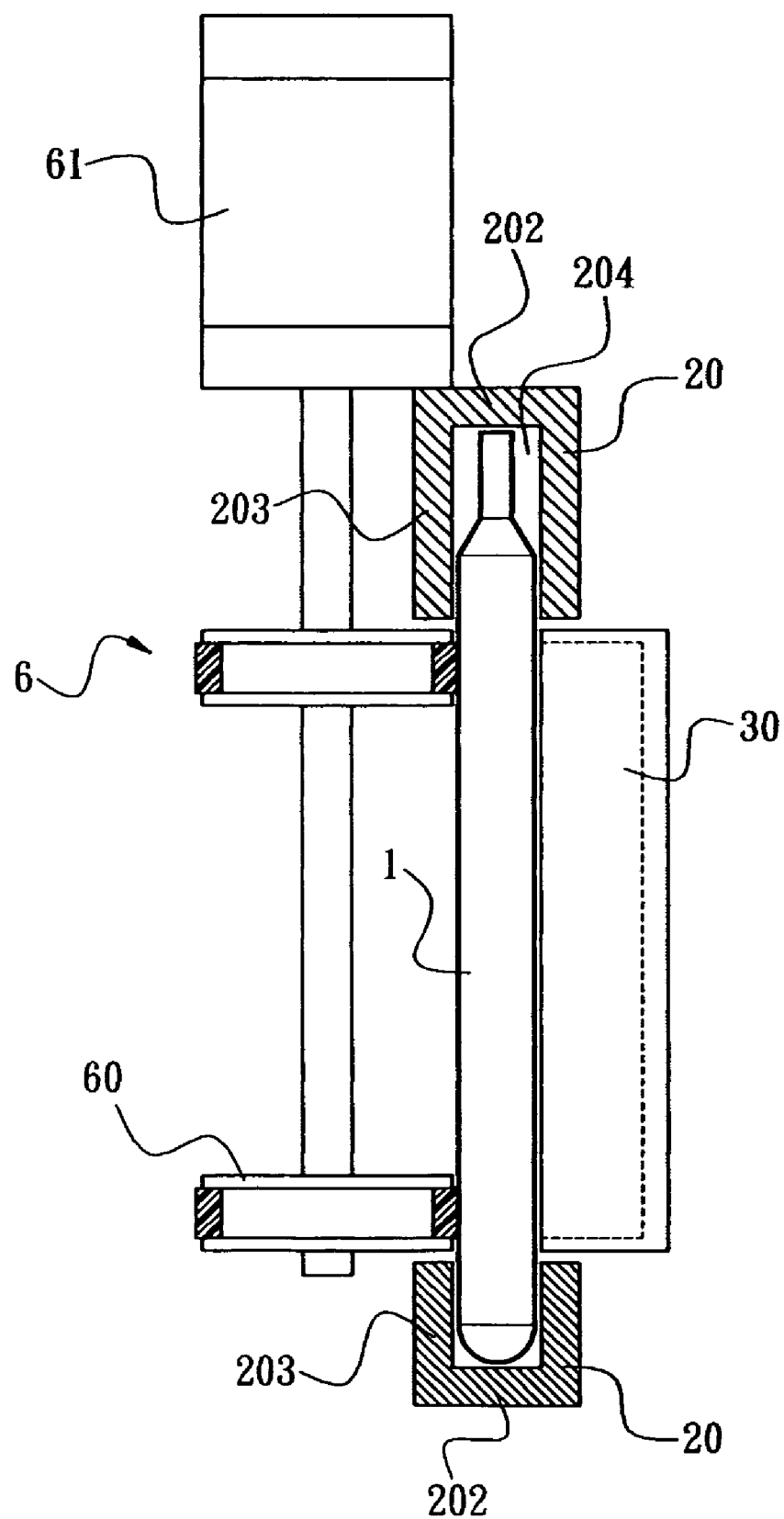
FIG. 5 shows a rear view or another preferred embodiment of the present invention.

FIG. 5 shows a rear view or another preferred embodiment of the present invention. The heat pipe 1 processed by the processing apparatus of the present invention is placed in erected stand, which is different to horizontal stand as shown in other embodiment.

The processing apparatus for parallel conveying heat pipes can be constructed in above manner.

In above-mentioned processing apparatus for parallel heat pipes, the pipes can be prevented from damage, which may be caused by conventional mechanic clip. Mover, the pipes 1 are continuously juxtaposed and conveyed by the conveying unit 6. The pipes 1 are pushed to subject to various processes including fluid injection, degas, sealing and solder. Therefore, the pipes are continuously manufactured and the yield is enhanced.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A processing apparatus for continuously conveying heat pipes, comprising:
    a feeder comprising a processing stage with a feeding end and an exiting end opposite to the feeding end, a feeding direction being defined from the feeding end and toward the exiting end;
    a conveying unit arranged on the processing stage; and
    a plurality of heat pipes juxtapose on the processing stage, the heat pipes are carried by the conveying unit having a plurality of guarding flanges on both sides of the processing stage, and a press tab provided atop each of the guarding flange to define a transmission space there between to accommodate the heat pipes to prevent undulance of the heat and sequentially processed by at least one processing station; and
    the processing station arranged on the processing stage along the feeding direction, having means for filling working fluid into the processing heat pipe;
    means for heating the processing heat pipe to remove gas from the heat pipe; and means for pressing the processing heat pipe to seal the heat pipes.

2. The processing apparatus for continuously conveying heat pipes as in claim 1, wherein the conveying unit comprises at least one belt pulley and a motor for driving the belt pulley.

3. The processing apparatus for continuously conveying heat pipes as in claim 1, further comprising an exit unit arranged at the exiting end of the feeder.

4. The processing apparatus for continuously conveying heat pipes as in claim 3, wherein the exit unit comprises a dispenser controlled by a pneumatic cylinder.

5. The processing apparatus for continuously conveying heat pipes as in claim 3, wherein the exit unit is connected to a supporting plate.

6. The processing apparatus for continuously conveying heat pipes as in claim 1, wherein the processing station further comprises a soldering unit for soldering the heat pipes.

* * * * *